United States Patent
Chen et al.

(10) Patent No.: US 10,515,402 B2
(45) Date of Patent: Dec. 24, 2019

(54) SYSTEMS AND METHODS FOR SEARCH RESULT DISPLAY

(71) Applicant: Wal-Mart Stores, Inc., Bentonville, AR (US)

(72) Inventors: Zebin Chen, Santa Clara, CA (US); Andrei Lopatenko, Cupertino, CA (US); Manas Pathak, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 794 days.

(21) Appl. No.: 15/011,504

(22) Filed: Jan. 30, 2016

(65) Prior Publication Data
US 2017/0221139 A1    Aug. 3, 2017

(51) Int. Cl.
| G06Q 30/00 | (2012.01) |
| G06Q 30/06 | (2012.01) |
| G06F 16/248 | (2019.01) |
| G06F 16/28 | (2019.01) |
| G06F 16/957 | (2019.01) |

(52) U.S. Cl.
CPC ....... *G06Q 30/0641* (2013.01); *G06F 16/248* (2019.01); *G06F 16/285* (2019.01); *G06F 16/957* (2019.01); *G06Q 30/0625* (2013.01); *G06Q 30/0643* (2013.01)

(58) Field of Classification Search
CPC .......... G06Q 30/0625; G06Q 30/0641; G06Q 30/0643; G06Q 16/285; G06Q 16/957; G06F 16/248
See application file for complete search history.

(56) References Cited

U.S. PATENT DOCUMENTS

| 6,489,968 | B1 * | 12/2002 | Ortega ................. G06F 3/0482 715/713 |
| 7,124,129 | B2 * | 10/2006 | Bowman ........... G06F 17/30675 |
| 8,006,197 | B1 * | 8/2011 | Nevill-Manning ........................ G06F 16/9577 715/788 |
| 8,161,072 | B1 | 4/2012 | Pfleger |

(Continued)

OTHER PUBLICATIONS

"Mobile Findex: Facilitating Information Access in Mobile Web Search with Automatic Result Clustering," by Tomi Heimonen, Advances in Human-Computer Interaction, vol. 2008 (Year: 2008).*

*Primary Examiner* — Anne M Georgalas
(74) *Attorney, Agent, or Firm* — Bryan Cave Leighton Paisner LLP

(57) ABSTRACT

In some embodiments, a method can comprise categorizing, in a database, one or more purchasing categories based at least in part on one or more queries. In some embodiments the one or more purchasing categories can comprise one or more products. The method can further comprise computing a set of browse categories of the one or more purchasing categories, loading the set of browse categories of the one or more purchasing categories into non-transitory memory, and receiving a query. In some embodiments, the method can further comprise determining one or more results for the query, the one or more results comprising a portion of the one or more products, analyzing intention of the query, and selecting a display configuration of the one or more results based at least in part on the intention. Other embodiments of related methods and systems are also provided.

23 Claims, 6 Drawing Sheets

(56) References Cited

U.S. PATENT DOCUMENTS

| | | | |
|---|---|---|---|
| 8,533,056 B2* | 9/2013 | Schory | G06Q 30/02 |
| | | | 705/26.1 |
| 8,548,876 B1* | 10/2013 | Fox | G06Q 30/00 |
| | | | 705/14.1 |
| 8,739,061 B1 | 5/2014 | Manning et al. | |
| 8,775,275 B1* | 7/2014 | Pope | G06Q 30/0641 |
| | | | 705/14.49 |
| 9,098,600 B2* | 8/2015 | Chetuparambil | G06Q 30/0256 |
| 9,400,587 B2* | 7/2016 | Roberts | H04L 67/10 |
| 9,767,417 B1* | 9/2017 | Hoover | G06N 7/02 |
| 9,881,332 B2* | 1/2018 | Bloem | G06Q 30/0631 |
| 2004/0260677 A1* | 12/2004 | Malpani | G06F 16/3338 |
| 2005/0222987 A1* | 10/2005 | Vadon | G06F 16/951 |
| 2006/0158385 A1* | 7/2006 | Etelapera | G06F 3/1438 |
| | | | 345/31 |
| 2007/0150368 A1* | 6/2007 | Arora | G06Q 30/02 |
| | | | 705/26.1 |
| 2008/0313011 A1* | 12/2008 | Rose | G06Q 30/02 |
| | | | 705/7.32 |
| 2011/0145285 A1* | 6/2011 | Gustafson | G06Q 30/02 |
| | | | 707/776 |
| 2012/0330962 A1* | 12/2012 | Huang | G06F 16/3322 |
| | | | 707/740 |
| 2014/0122300 A1 | 5/2014 | Gonsalves et al. | |
| 2014/0164385 A1* | 6/2014 | Liu | G06F 16/337 |
| | | | 707/740 |
| 2015/0186950 A1* | 7/2015 | Benaiah | G06Q 30/0269 |
| | | | 705/14.45 |
| 2017/0199918 A1* | 7/2017 | Nakahashi | G06F 16/24578 |
| 2018/0082330 A1* | 3/2018 | Koningstein | G06Q 30/00 |

\* cited by examiner

500

505 - Categorizing, in a database, one or more purchasing categories based at least in part on one or more queries, the one or more purchasing categories comprising one or more products.

510 - Computing a set of browse categories of the one or more purchasing categories.

515 - Loading the set of browse categories of the one or more purchasing categories into non-transitory memory.

FIG. 5

SYSTEMS AND METHODS FOR SEARCH RESULT DISPLAY

TECHNICAL FIELD

This disclosure relates generally to systems and methods for search result display, and relates more particularly to systems to analyze intention of a customer and select a display configuration based at least in part on the intention, and related methods.

BACKGROUND

Many search engines support search results in a grid view or a list view. In the grid view, items are shown in a square grid, often with key information (e.g., price, picture, shipping options, etc.). In list view, items are shown in a vertical, ordered list, with key information and additional details. Grid view can allow customers to browse products faster (e.g., visually scan more products per line), and it has the potential to display more items because each item takes less space. However, defaulting a display of search results to the grid view is not beneficial to customers who have a purchase intention. Therefore, we need a way to properly identify a query from a customer with browse intention and provide the search results in the grid view. Accordingly, there is a need for systems and methods to provide improved display configurations based on customer intent.

BRIEF DESCRIPTION OF THE DRAWINGS

To facilitate further description of the embodiments, the following drawings are provided in which:

FIG. 5 is a flowchart for another method, according to an embodiment; and

Figure 1:
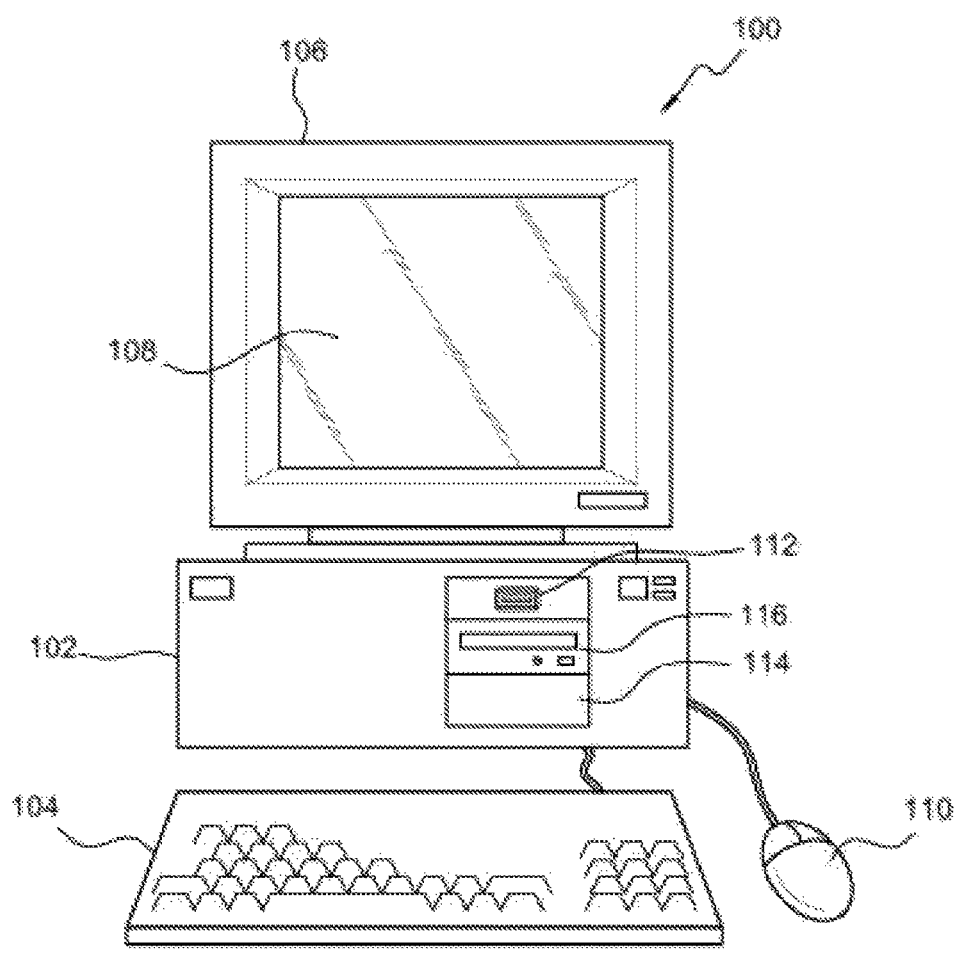
FIG. 1 illustrates a front elevation view of a computer system that is suitable for implementing at least part of a central computer system.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments include a system. In some embodiments, the system can comprise one or more processing modules and one or more non-transitory storage modules storing computing instructions configured to run on the one or more processing modules and perform acts of categorizing, in a database, one or more purchasing categories based at least in part on one or more queries, the one or more purchasing categories comprising one or more products, computing a set of browse categories of the one or more purchasing categories, and loading the set of browse categories of the one or more purchasing categories into non-transitory memory. In many embodiments, the one or more non-transitory storage modules storing computing instructions are further configured to run on the one or more processing modules and perform the acts of receiving a query, determining one or more results for the query, the one or more results comprising a portion of the one or more products, analyzing intention of the query, selecting a display configuration of the one or more results based at least in part on the intention, and facilitating display of the one or more results in the display configuration. In many embodiments, analyzing intention of the query can comprise retrieving the one or more purchasing categories associated with the query, comparing the at least one of the one or more purchasing categories associated with the query with the set of browse categories of the one or more purchasing categories, and determining an overlap of purchasing categories of the one or more purchasing categories based on the compare.

Some embodiments include a method. In many embodiments, the method can comprise categorizing, in a database, one or more purchasing categories based at least in part on one or more queries. In some embodiments the one or more purchasing categories can comprise one or more products. In a number of embodiments, the method can further comprise computing a set of browse categories of the one or more purchasing categories, loading the set of browse categories of the one or more purchasing categories into non-transitory memory, and receiving a query. In some embodiments, the method can further comprise determining one or more results for the query, the one or more results comprising a portion of the one or more products, analyzing intention of the query, selecting a display configuration of the one or more results based at least in part on the intention, and facilitating display of the one or more results in the display configuration. In many embodiments, analyzing intention of the query can comprise retrieving the one or more purchasing categories associated with the query, comparing the at least one of the one or more purchasing categories associated with the query with the set of browse categories of the one or more purchasing categories, and determining an overlap of purchasing categories of the one or more purchasing categories based on the compare.

Various embodiments of systems and methods for search result display can comprise a method. In many embodiments, the method can comprise receiving a query, determining one or more results for the query, the one or more results comprising a portion of one or more products, analyzing intention of the query, selecting a display configuration of the one or more results based at least in part on the intention, and facilitating display of the one or more results in the display configuration. In many embodiments, analyzing intention of the query can comprise retrieving the one or more purchasing categories associated with the query, comparing the at least one of the one or more purchasing categories associated with the query with the set of browse categories of the one or more purchasing categories, and determining an overlap of purchasing categories of the one or more purchasing categories based on the compare.

Figure 2:
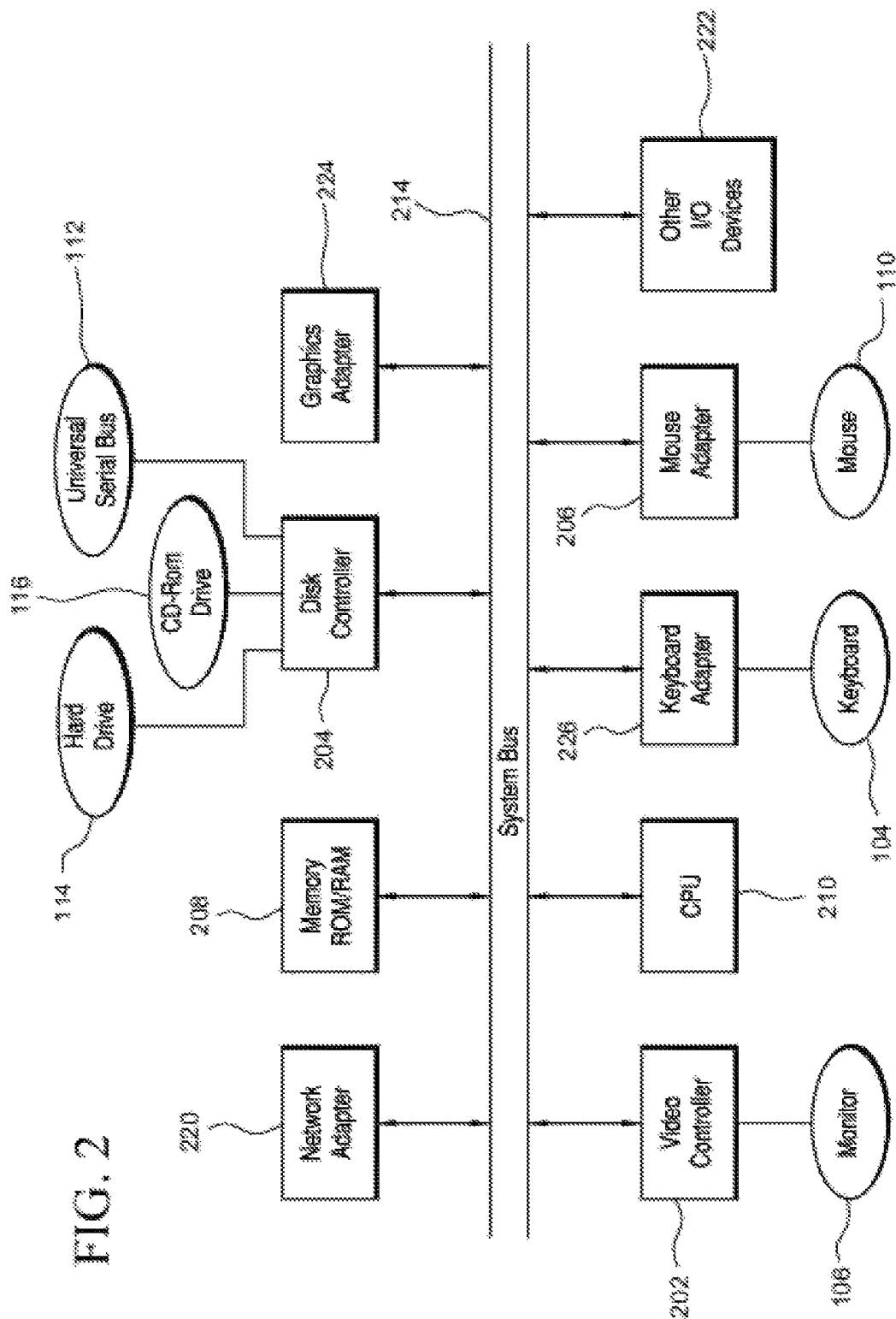
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
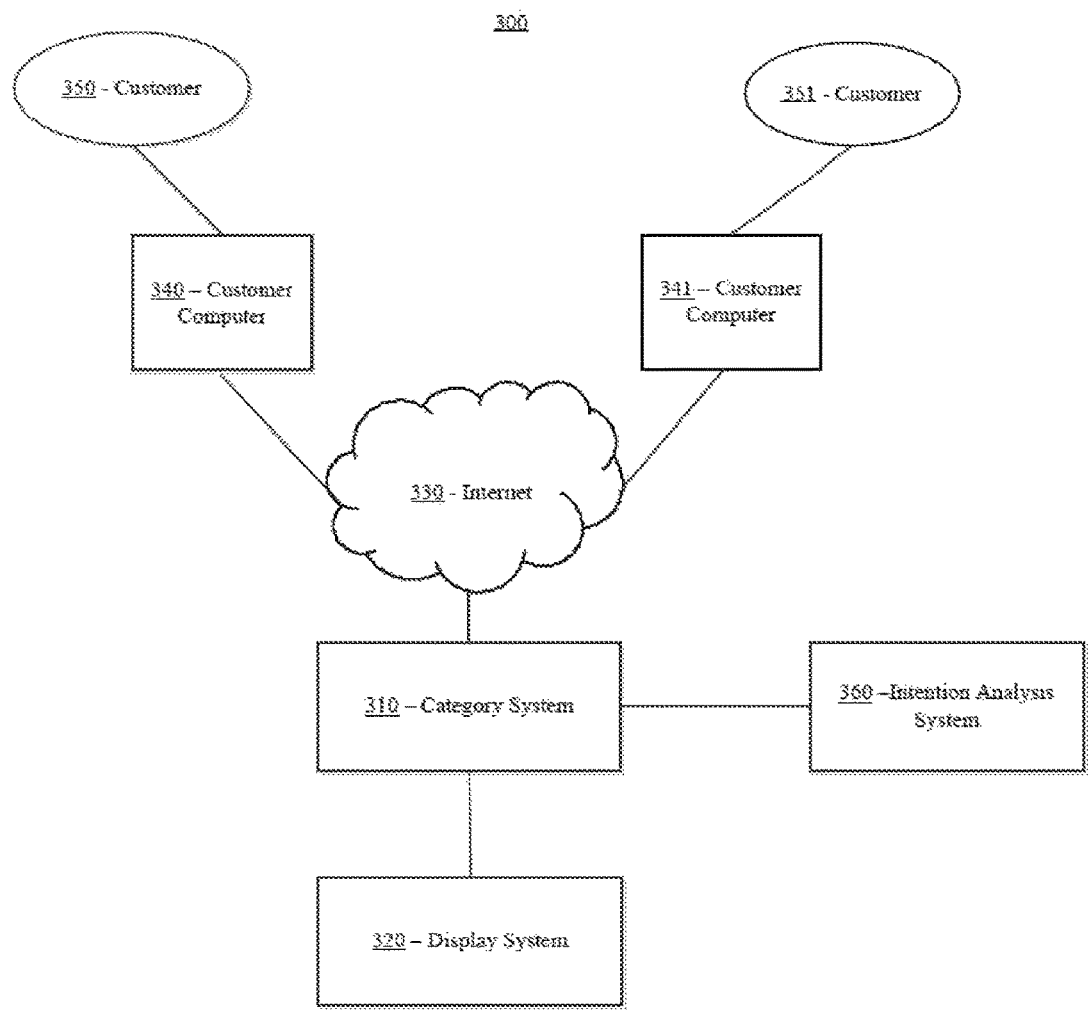
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In a number of embodiments, system 300 can comprise an category system 310, display system 320, and an intention analysis system 360. In some embodiments, category system 310, display system 320, and intention analysis system 360 can each be a computer system 100 (FIG. 1), as described above, and can each be a single computer, a single server, or a cluster or collection of computers or servers. In some embodiments, category system 310 can be in communication with an inventory system (not shown) which can track distinct products or items (e.g., stock keeping units (SKUs)) which can be ordered through the online retailer and which can be housed at one or more warehouses. In many embodiments, warehouses can comprise brick-and-mortar stores, distribution centers, or other storage facilities.

In many embodiments, category system 310, display system 320, and/or intention analysis system 360 can each comprise one or more input devices (e.g., one or more keyboards, one or more keypads, one or more pointing devices such as a computer mouse or computer mice, one or more touchscreen displays, etc.), and/or can each comprise one or more display devices (e.g., one or more monitors, one or more touch screen displays, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of category system 310, display system 320, and/or intention analysis system 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of category system 310, display system 320, and/or intention analysis system 360. In a similar manner, the processing module(s) and the memory storage module(s) can be local and/or remote to each other.

In many embodiments, category system 310 and/or display system 320 can be configured to communicate with one or more customer computers 340 and 341, which also can be referred to as user computers. In some embodiments, category system 310, intention analysis system 360, and/or display system 320 can communicate or interface (e.g. interact) with one or more user computers, such as customer computers 340 and 341, through a network or internet 330. Accordingly, in many embodiments, category system 310 and/or display system 320 can refer to a back end of system 300 operated by an operator and/or administrator of system 300, and customer computers 340 and 341 can refer to a front end of system 300 used by one or more customers 350 and 351, who also can be referred to as users. In these or other embodiments, the operator and/or administrator of system 300 can manage category system 310 and/or display system 320, the processing module(s) of order system 310, and/or the memory storage module(s) of category system 310 and/or display system 320 using the input device(s) and/or display device(s) of category system 310 and/or display system 320.

Meanwhile, in many embodiments, category system 310, display system 320, and/or intention analysis system 360 also can be configured to communicate with one or more databases. The one or more database can comprise a product database that contains information about products sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s) and/or the non-transitory memory storage module(s) storing the one or more databases or it can be spread across multiple of the memory storage module(s) and/or non-transitory memory storage module(s) storing the one or more databases, depending on the size of the particular database and/or the storage capacity of the memory storage module(s) and/or non-transitory memory storage module(s).

The one or more databases each can comprise a structured (e.g., indexed) collection of data and can be managed by any suitable database management systems (e.g., SQL or NoSQL) configured to define, create, query, organize, update, and manage database(s). Exemplary database management systems can include Couchbase Database, MySQL (Structured Query Language) Database, PostgreSQL Database, Microsoft SQL Server Database, Oracle Database, SAP (Systems, Applications, & Products) Database, and IBM DB2 Database.

Meanwhile, communication between category system 310, display system 320, and/or intention analysis system 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

Figure 4:
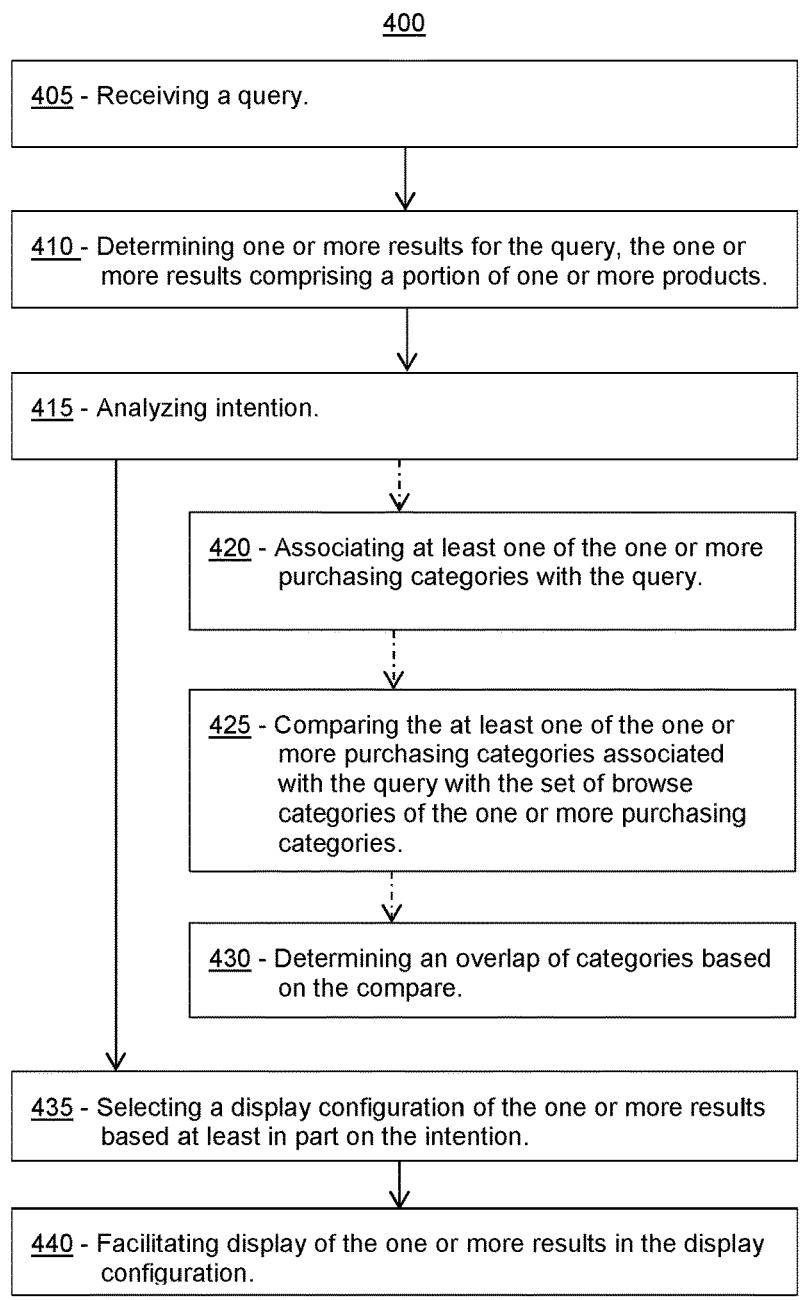
FIG. 4 illustrates a flowchart for a method, according to an embodiment.
Figure 6:
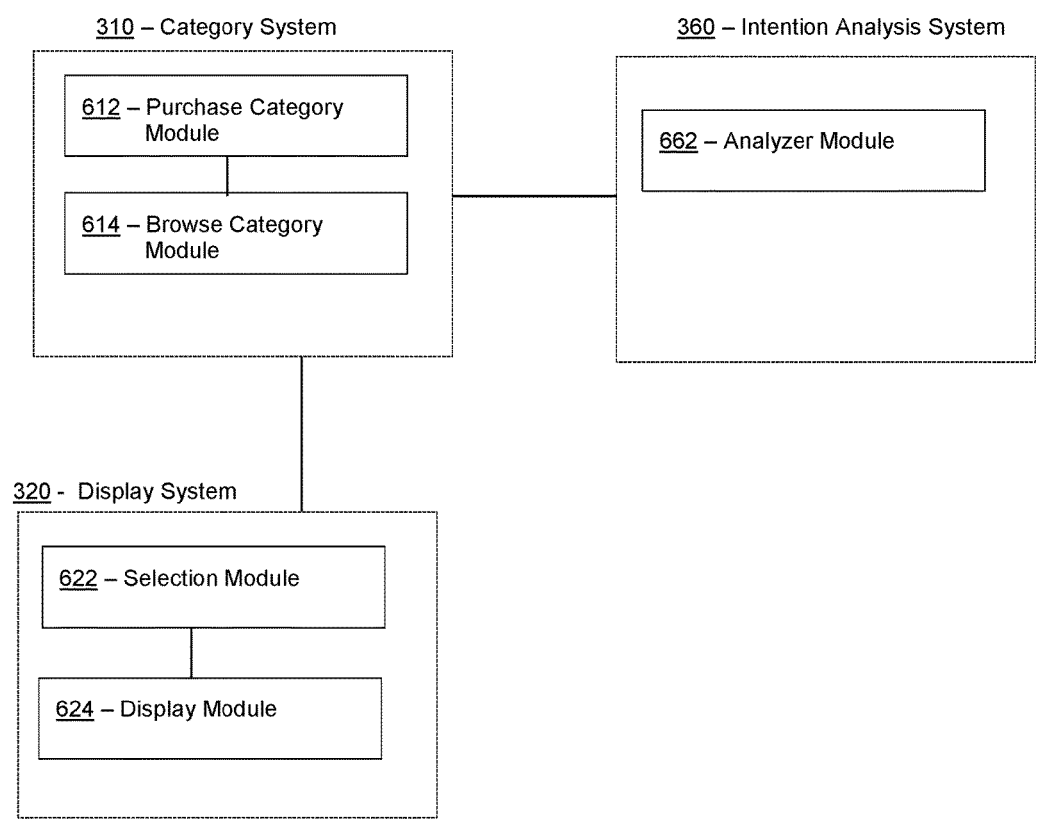
FIG. 6 illustrates a representative block diagram of a portion of the system according to FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 612, 614, 622, 624 or 662 (FIG. 6). Such non-transitory memory storage modules can be part of a computer system such as category system 310 (FIG. 3), display system 320 (FIG. 3) and/or intention analysis system 360 (FIG. 3). The processing module(s) can be similar or identical to the processing module(s) described above with respect to computer system 100 (FIG. 1).

In some embodiments, method 400 can result in positive results for various key performance indicators (KPIs). In some embodiments, the number of products added to the checkout cart, the number of conversions from viewing to purchasing, and/or the number of individual product views can increase when a grid view is provided for a customer (e.g., customer 350 (FIG. 3) with a browse intention.

Method 400 can comprise activity 405 of receiving a query. In some embodiments, one or more queries can comprise the query. In many embodiments, the query can comprise a search for a product or a description of a product. A product can refer to an item or stock-keeping-unit (SKU). In some embodiments, the product can be one of one or more products. Method 400 can further comprise activity 410 of determining one or more results for the query. In many embodiments, the one or more results for the query can comprise a portion of one or more products.

In a number of embodiments, method 400 also can comprise activity 415 of analyzing intention of the query. Intention can comprise a purchasing intention or browse intention of a user or customer (e.g., customer 350 (FIG. 3)). In some embodiments, analyzing intention of the query can comprise activity 420 of associating at least one of the one or more purchasing categories with the query. In some embodiments, the one or more purchasing categories can be based at least in part on a category hierarchy (e.g., "Departments"→"Electronics"→"Computers"→"Laptops").

In many embodiments, the one or more purchasing categories can be categorized according to method 500 of FIG. 5. Turning to FIG. 5, method 500 can comprise activity 505 of categorizing, in a database, one or more purchasing categories based at least in part on one or more queries, the one or more purchasing categories comprising one or more products. In some embodiments, the one or more purchasing categories can be categorized by analyzing the query to determine which purchasing category is a dominant category associated with the query. In some embodiments, determining which purchasing category is the dominant category associated with the query can comprise determining the granularity of the categorized purchasing category. In one non-limiting example, a broad query, such as a query for "shorts," can be categorized in a "clothing" category, which can be determined (either through empirical studies and/or heuristics as discussed below) to be a browse category, while a less broad query, such as "SAMSUNG 40" HD TV," can be categorized as an "HD Television" category, which can be determined (either through empirical studies and/or heuristics as discussed below) to be a non-browse category or a default list category.

In some embodiments, categorizing the one or more purchasing categories can be based on empirical studies (e.g., feedback or surveys questions). In a number of embodiments, customers (e.g., customer 350 (FIG. 3) and/or customer 351 (FIG. 3)) can be asked questions related to their intention associated with the query (e.g., "do you know exactly what product you want to buy when navigating in this category?" or "is it important to compare multiple products before making a purchase in this category?"). As described below, other embodiments can comprise categorizing the one or more purchasing categories based at least in part on heuristics.

One embodiment of activity 505 of categorizing, in a database, one or more purchasing categories based at least in part on one or more queries can comprise query categorization. Query categorization can comprise, a for each query, accumulating a product showing number and a product click number for the time period (e.g. approximately 180 days). In some embodiments query categorization can further comprise rolling up the product showing number and the product click number by product-category relationships to establish tuples (e.g., query, category_show, category_click, and/or day). In some embodiments, category_show can comprise items that show under a particular category, and category_click can comprise item clicks under a particular category. Then, for each tuple, compute the following score:

$$Score = ctr - 3 * sqrt(ctr*(1-ctr)/category\_show);$$

wherein $ctr = category\_click/category\_show;$ $$Final\ score = sum(score * factor^{**}n).$$

In one embodiment, the factor can comprise the time decaying factor between [0, 1], and n is taken from each number between [0, 180].

In many embodiments, method 500 can further comprise activity 510 of computing a set of browse categories of the one or more purchasing categories. In many embodiments, a browse category of the set of browse categories can comprise a number of subcategories. In some embodiments, computing the set of browse categories of the one or more purchasing categories can comprise a heuristic approach of analyzing historical sales data of the one or more products. In some embodiments analyzing the historical sales data of the one or more products can comprise determining the sales data of the one or more products over a time period. In many embodiments, the time period can be approximately 30 days. In other embodiments, the time period can be approximately 24 hours, 1 week, 2 weeks, one month, 60 days, 2 months, 3 months, one quarter, 180 days, or 1 year. In some embodiments, the time period for seasonal and/or sale items can be less than approximately 30 days. In some embodiments, computing the set of browse categories of the one or more purchasing categories can comprise aggregating historical product views over a product historical time period. In many embodiments, the product historical time period can be approximately 30 days. In other embodiments, the product historical period can be approximately 24 hours, 1 week, 2 weeks, one month, 60 days, 2 months, 3 months, one quarter, 180 days, or 1 year. In some embodiments, the product historical time period for seasonal and/or sale items can be less than approximately 30 days. In many embodiments product views can comprise clicks on a product. In some embodiments, clicks on the product can comprise instances when a product is added to the checkout cart, a product is added to a wishlist or layaway, a product link is sent to another customer from the viewing customer, and/or a product is viewed by the customer or showed to the customer. In many embodiments, product views do not include actual sales or completed orders.

In some embodiments, one heuristic can be that, when a customer has a browse intention, the customer tends to use browse functionality rather than search or query functionality of the eCommerce website. Therefore, for a specific category, we can compute category_click data for each source of customer browsing and each source of customer search or query, and compare the result against the average across all categories. In one embodiment, an approach can be to set a simple threshold above the average: if the ratio of category_click from browse vs. category_click from query is above the threshold, the specific category can be a browse category. Otherwise, the specific category can be a purchase or list category. An advantage of this approach is that, once data aggregation is done, it can compute the list of browse categories in a short time at a fine level. In some embodiments, the heuristic approach can be used to determine a list of candidates for browse categories, then conduct the empirical studies as described above. An advantage of first conducting a heurist approach is the ability to reduce the survey or empirical study from tens of thousands to merely a few hundred in a short time, increasing efficiency and accuracy.

In many embodiments, method 500 can further comprise activity 515 of loading the set of browse categories of the one or more purchasing categories into non-transitory memory. In many embodiments, activity 515 of loading the set of browse categories of the one or more purchasing categories into non-transitory memory can allow for future recall and/or repeated consumption.

Returning to FIG. 4, activity 415 of analyzing intention of the query can further comprise activity 425 of comparing the at least one of the one or more purchasing categories associated with the query with a predetermined set of browse categories of the one or more purchasing categories. In some embodiments, the predetermined set of browse categories of the one or more purchasing categories can be predetermined according to method 500 of FIG. 5.

In many embodiments, activity 415 of analyzing intention of the query can further comprise activity 430 of determining an overlap of purchasing categories of the one or more purchasing categories based on the compare. In many embodiments, an overlap of purchasing categories of the one or more purchasing categories comprises a match between at least one of the one or more purchasing categories associated with the query and at least one browse category of the set of browse categories of the one or more purchasing categories. An overlap of purchasing categories of the one or more purchasing categories can indicate a browse intention of the customer (e.g., customer 350 (FIG. 3)). In many embodiments, no overlap of purchasing categories of the one or more purchasing categories can indicate a purchase intention of the customer (e.g., customer 350 (FIG. 3)).

In many embodiments, method 400 can further comprise activity 435 of selecting a display configuration of the one or more results based at least in part on the intention. In some embodiments, activity 435 of selecting the display configuration can comprise at least one of: selecting a grid display or grid view if the overlap of purchasing categories of the one or more purchasing categories comprises one or more overlapping categories, or selecting a list display or list view if the overlap of purchasing categories of the one or more purchasing categories comprises no overlapping categories. In many embodiments, the grid display can comprise a grid of approximately 40 items. In embodiments in which a customer (e.g., customer 350 (FIG. 3)) is viewing the eCommerce website on a mobile device (e.g., a smartphone device or a tablet device), the grid view can comprise less than 40 items. In many embodiments, the list view is the default display and can comprise a vertical list of at least approximately 20 items. In embodiments in which a customer (e.g., customer 350 (FIG. 3) is viewing the eCommerce website on the mobile device, the list view can comprise less than approximately 20 items and/or a scrolling list. In some embodiments in which the customer (e.g., customer 350 (FIG. 3) is viewing the eCommerce website on the mobile device, the grid view can be disabled.

In a number of embodiments, method 400 can further comprise activity 440 of facilitating display of the one or more results in the display configuration. In some embodiments, facilitating display of the one or more results in the display configuration can comprise modifying the configuration of the search results for viewing by the customer (e.g., customer 350 (FIG. 3)).

FIG. 6 illustrates a block diagram of a portion of system 300 comprising category system 310, display system 320, and intention analysis system 360, according to the embodiment shown in FIG. 3. Category system 310, display system 320, and intention analysis system 360 each are merely exemplary and are not limited to the embodiments presented herein. Category system 310, display system 320, and intention analysis system 360 each can be employed in many different embodiments or examples not specifically depicted or described herein. In some embodiments, certain elements or modules of category system 310, display system 320 and intention analysis system 360 can perform various procedures, processes, and/or acts. In other embodiments, the procedures, processes, and/or acts can be performed by other suitable elements or modules.

In many embodiments, category system 310 can comprise non-transitory memory storage modules 612 and 614, display system 320 can comprise non-transitory memory storage modules 622 and 624, and intention analysis system 360 can comprise non-transitory memory storage module 662. Memory storage module 612 can be referred to as a purchase category module 612, and memory storage module 614 can be referred to as a browse category module 614. Memory storage module 622 can be referred to as a selection module 622, and memory storage module 624 can be referred to as a display module 624. Memory storage module 662 can be referred to as a an analyzer module 662.

In many embodiments, purchase category module 612 can store computing instructions configured to run on one or more processing modules and perform one or more acts of methods 400 (FIG. 4) and/or 500 (FIG. 5) (e.g., act 505 of categorizing, in a database, one or more purchasing categories based at least in part on one or more queries, the one or more purchasing categories comprising one or more products (FIG. 5). In some embodiments, browse category module 614 can store computing instructions configured to run on one or more processing modules and perform one or more acts of methods 400 (FIG. 4) and/or 500 (FIG. 5) (e.g., act 510 of computing a set of browse categories of the one or more purchasing categories (FIG. 5)).

In some embodiments, selection module 622 can store computing instructions configured to run on one or more processing modules and perform one or more acts of methods 400 (FIG. 4) and/or 500 (FIG. 5) (e.g., act 435 of selecting a display configuration of the one or more results based at least in part on the intention (FIG. 4)). In some embodiments, display module 624 can store computing instructions configured to run on one or more processing modules and perform one or more acts of methods 400 (FIG. 4) and/or 500 (FIG. 5) (e.g., act 440 of selecting facilitating display of the one or more results in the display configuration (FIG. 4)).

In many embodiments, analyzer module 662 can store computing instructions configured to run on one or more processing modules and perform one or more acts of methods 400 (FIG. 4) and/or 500 (FIG. 5) (e.g., act 425 of comparing the one or more purchasing categories associated with the query with a predetermined set of browse categories of the one or more purchasing categories (FIG. 4)).

Although systems and methods for an order filling has been described above, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the activities of FIGS. 3-6 may include different activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors;
one or more non-transitory computer-readable media storing computing instructions configured to run on the one or more processors and perform:
    categorizing, in a database, one or more purchasing categories based at least in part on one or more queries, the one or more purchasing categories comprising one or more products;
    computing a set of browse categories for each category of the one or more purchasing categories, comprising:
        quantifying a ratio of first click data for the each category received from browsing activity to second click data for the each category received from query activity; and
        categorizing the each category of the one or more purchasing categories as a browse category when the ratio is above a predetermined threshold;
    loading the set of browse categories for each category of the one or more purchasing categories into non-transitory memory;
    receiving a query;
    determining one or more results for the query, the one or more results comprising a portion of the one or more products of the one or more purchasing categories;
    analyzing an intention of the query by:
        associating at least one of the one or more purchasing categories with the query;
        generating a comparison of (a) the at least one of the one or more purchasing categories associated with the query and (b) the set of browse categories for each category of the one or more purchasing categories; and
        determining an overlap of purchasing categories of the at least one of the one or more purchasing categories with the set of browse categories based on the comparison, wherein the at least one of the one or more purchasing categories match the query, and wherein the overlap indicates at least a browse intention of the query;
    selecting a display configuration of the one or more results based at least in part on the intention of the query; and
    sending instructions to display the one or more results in the display configuration matching the intention of the query on an interface of a mobile device.

2. The system of claim 1, wherein:
computing the set of browse categories for each category of the one or more purchasing categories further comprises analyzing historical sales data of the one or more products.

3. The system of claim 2, wherein:
analyzing the historical sales data of the one or more products comprises determining sales data of the one or more products over a time period.

4. The system of claim 3, wherein:
the time period is approximately 30 days.

5. The system of claim 1, wherein:
computing the set of browse categories for each category of the one or more purchasing categories further comprises aggregating historical product views over a product historical time period.

6. The system of claim 1, wherein:
selecting the display configuration comprises at least one of:
    selecting a grid display when the overlap of purchasing categories of the at least one of the one or more purchasing categories comprises one or more overlapping categories; or
    selecting a list display when the overlap of purchasing categories of the at least one of the one or more purchasing categories comprises no overlapping categories.

7. The system of claim 1, wherein:
computing the set of browse categories for each category of the one or more purchasing categories further comprises:
    analyzing historical sales data of the one or more products; and
    aggregating historical product views over a product historical time period;
analyzing the historical sales data of the one or more products comprises determining sales data of the one or more products over a time period; and
selecting the display configuration comprises at least one of:
    selecting a grid display when the overlap of purchasing categories of the at least one of the one or more purchasing categories comprises one or more overlapping categories; or
    selecting a list display when the overlap of purchasing categories of the at least one of the one or more purchasing categories comprises no overlapping categories.

8. A method comprising:
categorizing, in a database, one or more purchasing categories based at least in part on one or more queries, the one or more purchasing categories comprising one or more products;
computing a set of browse categories, for each category of the one or more purchasing categories, comprising:
    quantifying a ratio of first click data for the each category received from browsing activity to second click data for the each category received from query activity; and
    categorizing the each category of the one or more purchasing categories as a browse category when the ratio is above a predetermined threshold;
loading the set of browse categories for each category of the one or more purchasing categories into non-transitory memory;

receiving a query;
determining one or more results for the query, the one or more results comprising a portion of the one or more products of the one or more purchasing categories;
analyzing an intention of the query by:
 associating at least one of the one or more purchasing categories with the query;
 generating a comparison of (a) the at least one of the one or more purchasing categories associated with the query and (b) the set of browse categories for each category of the one or more purchasing categories; and
 determining an overlap of purchasing categories of the at least one of the one or more purchasing categories with the set of browse categories based on the comparison, wherein the at least one of the one or more purchasing categories match the query, and wherein the overlap indicates at least a browse intention of the query;
selecting a display configuration of the one or more results based at least in part on the intention of the query; and
sending instructions to display the one or more results in the display configuration matching the intention of the query on an interface of a mobile device.

9. The method of claim 8, wherein:
computing the set of browse categories for each category of the one or more purchasing categories further comprises analyzing historical sales data of the one or more products.

10. The method of claim 9, wherein:
analyzing the historical sales data of the one or more products comprises determining sales data of the one or more products over a time period.

11. The method of claim 10, wherein:
the time period is approximately 30 days.

12. The method of claim 9, wherein:
computing the set of browse categories for each category of the one or more purchasing categories further comprises aggregating historical product views over a product historical time period.

13. The method of claim 12 wherein:
the historical time period is approximately 30 days.

14. The method of claim 9, wherein:
computing the set of browse categories for each category of the one or more purchasing categories further comprises:
 analyzing the historical sales data of the one or more products; and
 aggregating historical product views over a product historical time period; and
analyzing the historical sales data of the one or more products comprises determining sales data of the one or more products over a time period; and
selecting the display configuration comprises at least one of:
 selecting a grid display when the overlap of purchasing categories of the at least one of the one or more purchasing categories comprises one or more overlapping categories; or
 selecting a list display when the overlap of purchasing categories of the at least one of the one or more purchasing categories comprises no overlapping categories.

15. The method of claim 8, wherein:
selecting the display configuration comprises at least one of:
 selecting a grid display when the overlap of purchasing categories of the at least one of the one or more purchasing categories comprises one or more overlapping categories; or
 selecting a list display when the overlap of purchasing categories of the at least one of the one or more purchasing categories comprises no overlapping categories.

16. A method comprising:
receiving a query;
determining one or more results for the query, the one or more results comprising a portion of one or more products; and
analyzing an intention of the query by:
 associating at least one of one or more purchasing categories with the query;
 generating a comparison of (a) the at least one of the one or more purchasing categories associated with the query and (b) a set of browse categories for each category of the one or more purchasing categories, wherein computing the set of browse categories of the one or more purchasing categories comprises, for each category of the one or more purchasing categories:
  quantifying a ratio of first click data for the each category received from browsing activity to second click data for the each category received from query activity; and
  categorizing the each category of the one or more purchasing categories as a browse category when the ratio is above a predetermined threshold; and
 determining an overlap of purchasing categories of the at least one of the one or more purchasing categories with the set of browse categories based on the comparison, wherein the at least one of the one or more purchasing categories match the query, and wherein the overlap indicates at least a browse intention of the query;
selecting a display configuration of the one or more results based at least in part on the intention of the query; and
sending instructions to display the one or more results in the display configuration matching the intention of the query on an interface of a mobile device.

17. The method of claim 16, wherein:
the set of browse categories for each category of the one or more purchasing categories are further computed by analyzing historical sales data of the one or more products.

18. The method of claim 17, wherein:
analyzing the historical sales data of the one or more products comprises determining sales data of the one or more products over a time period.

19. The method of claim 18, wherein:
the time period is approximately 30 days.

20. The method of claim 16, wherein:
the set of browse categories for each category of the one or more purchasing categories are further computed by aggregating historical product views over a product historical time period.

21. The method of claim 20, wherein:
the product historical time period is approximately 30 days.

22. The method of claim 16, wherein:
selecting the display configuration comprises at least one of:
- selecting a grid display when the overlap of purchasing categories of the at least one of the one or more purchasing categories comprises one or more overlapping categories; or
- selecting a list display when the overlap of purchasing categories of the at least one of the one or more purchasing categories comprises no overlapping categories.

23. The method of claim 16, wherein:
the set of browse categories for each category of the one or more purchasing categories are further computed by:
- analyzing historical sales data of the one or more products; and
- aggregating historical product views over a product historical time period;
- the analyzing the historical sales data of the one or more products comprises determining sales data of the one or more products over a time period; and selecting the display configuration comprises at least one of:
- selecting a grid display when the overlap of purchasing categories of the at least one of the one or more purchasing categories comprises one or more overlapping categories; or
- selecting a list display when the overlap of purchasing categories of the at least one of the one or more purchasing categories comprises no overlapping categories.

* * * * *